United States Patent
Rai et al.

(10) Patent No.: US 8,554,537 B2
(45) Date of Patent: Oct. 8, 2013

(54) METHOD AND DEVICE FOR TRANSLITERATION

(75) Inventors: Piyush Kumar Rai, Bangalore (IN); Samarth Vinod Deo, Bangalore (IN)

(73) Assignee: Samsung Electronics Co., Ltd (KR)

(*) Notice: Subject to any disclaimer, the term of this patent is extended or adjusted under 35 U.S.C. 154(b) by 408 days.

(21) Appl. No.: 12/911,384

(22) Filed: Oct. 25, 2010

(65) Prior Publication Data

US 2011/0099000 A1   Apr. 28, 2011

(30) Foreign Application Priority Data

Oct. 23, 2009 (IN) .......................... 2573/CHE/2009
Oct. 5, 2010 (KR) ........................ 10-2010-0096762

(51) Int. Cl.
   *G06F 17/28* (2006.01)
(52) U.S. Cl.
   USPC ............... 704/2; 704/1; 704/3; 704/5; 704/8; 704/10

(58) Field of Classification Search
   USPC ........................ 704/2, 1, 3, 5, 8, 10
   See application file for complete search history.

(56) References Cited

U.S. PATENT DOCUMENTS

| | | | |
|---|---|---|---|
| 6,411,932 B1* | 6/2002 | Molnar et al. | 704/260 |
| 2005/0182616 A1* | 8/2005 | Kotipalli | 704/2 |
| 2009/0070095 A1* | 3/2009 | Gao | 704/2 |

* cited by examiner

*Primary Examiner* — Qi Han
(74) *Attorney, Agent, or Firm* — The Farrell Law Firm, P.C.

(57) ABSTRACT

A method for transliteration includes receiving input such as a word, a sentence, a phrase, and a paragraph, in a source language, creating source language sub-phonetic units for the word and converting the source language sub-phonetic units for the word to target language sub-phonetic units, retrieving ranking for each of the target language sub-phonetic units from a database and creating target language words for the word in the source language based on the target language sub-phonetic units and ranking of the each of the target language sub-phonetic units. The method further includes identifying candidate target language words based predefined criteria, and displaying candidate target language words.

28 Claims, 6 Drawing Sheets

METHOD AND DEVICE FOR TRANSLITERATION

PRIORITY

This application claims priority under 35 U.S.C. §119(a) to an application filed in the Indian Industrial Property Office on Oct. 23, 2009 and assigned Serial No. 2573/CHE/2009 and to an application filed in the Korean Industrial Property Office on Oct. 5, 2010 and assigned Serial No. 10-2010-0096762, the contents of both of which are incorporated herein by reference.

BACKGROUND OF THE INVENTION

1. Field of the Invention

The present invention relates generally to electronic devices, and more specifically, to a method and device for transliteration in an electronic device.

2. Description of the Related Art

Most electronic devices include an input module that is configured to generate input in a particular language. For example, a mobile phone can include keypad that is configured to generate input only in the English language. Users desiring to provide text input to the electronic device in their native language can frequently use these electronic devices. In such a scenario, a user may not be able to use these electronic devices to conveniently input text in their native language. For example, a user desires to send a Short Messaging Service (SMS) message in Korean language but may not be able to do so, due to unavailability of a keypad configured to accept text in the Korean language.

For a user to enter a text in a script/language different from the script/language for which the keypad is designed to provide input to the electronic device, transliteration is the only option. Transliteration can broadly be defined as a process of entering data in one language, hereafter referred to as source language, by using the script of another language, hereafter referred to as target language.

In one known technique of transliteration, static mapping of a source language character with a target language character is stored in the electronic device, resulting in excessive memory use. In this technique a user is required to remember a keystroke in the source language that corresponds to the desired character in the target language. In addition, in this technique transliteration of words is case sensitive. For example, 'd' on an English keypad can be used for typing for द (in Hindi language) and 'D' can be used for typing 'ड ' (in Hindi language). However, users generally use 'd' to type both ड and द . As result, a user has to follow a complex syntax to construct output and the electronic device requires additional processing power.

According to another known technique, a decision tree is created based on a position of each source language character in source words by using an automated learning model. The decision tree is composed of a number of rules that describe a mapping of a particular character in a target language to be programmatically mapped to various possible ways of transliterating the character in a source language, based on the context of that character. The context can be defined by 4 to 5 preceding and succeeding source and target language characters. As a result, the decision tree predicts the target language character that should appear for corresponding source language character, depending on the context of the character in a word and by selecting the appropriate rule.

The learning model described in the foregoing technique is based on raw learning of each source language character, at each position of occurrence of the character in a word. The learning for each character of a source language creates a number of possible mappings to that of target language characters based on the context of source language character. As there can be multiple occurrences of a source language character in a word, generating the rules for each character based on its context at each position of its occurrence requires a large amount of memory. Further, the training model for target language is dependent on the source language. This requires the training model (for a particular target language) to be executed for each instance of the source language.

In yet another technique, transliteration is based on the bilingual dictionary of segments corresponding to a word-pair. Each word-pair includes a source word to which a large number of target words correspond. Each source word is specified in a source language and each target word is a transliteration of a corresponding source word in a target language. The word-pairs are ranked based on the statistical information from a corpus of parallel text having first text in a source language and second text in a target language. The decision of which target language segment should appear for a particular source language segment is based on the ranks being assigned to each word pair. To further enhance the transliteration, the lookup for the transliteration of word is performed in a bilingual dictionary in which each word in source language has a corresponding transliterated word in the target language.

The learning model described in the previous technique employs use of a bilingual dictionary to store a number of segments and words in the form of a word-pair where a source language word (or segment) is directly mapped to its corresponding target language word (or segment). As a result, storing information for bilingual entries in a dictionary requires the use of a large amount of memory. Further employing a bilingual dictionary involves dependency of a source language over a target language and vice-versa.

SUMMARY OF THE INVENTION

In light of the foregoing problems occurring in the prior art, there is a need for a system and method for efficient transliteration.

In an embodiment of the present invention, a method for transliteration includes receiving a word in a source language, creating source language sub-phonetic units for the word, converting the source language sub-phonetic units for the word to target language sub-phonetic units, retrieving ranking for each of the target language sub-phonetic units from a database, creating target language words for the word in the source language based on the target language sub-phonetic units and ranking of the each of the target language sub-phonetic units, identifying candidate target language words based predefined criteria, and displaying candidate target language words.

In another embodiment, a method for transliteration includes receiving a text input in a source language, creating source language sub-phonetic units for each word in the text input, converting the source language sub-phonetic units for the each word in the text input to target language sub-phonetic units, retrieving ranking for each of the target language sub-phonetic units from a database, creating target language words based on the target language sub-phonetic units and ranking of the each of the target language sub-phonetic units, identifying candidate target language words based on predefined criteria, and displaying the text input in the target language based on the candidate target language words.

In yet another embodiment, a method for transliteration includes receiving a text input in a source language, creating source language sub-phonetic units for each word in the text input, converting the source language sub-phonetic units for the each word in the text input to target language sub-phonetic units, retrieving ranking of each of the target language sub-phonetic units from a database, creating target language words based on the target language sub-phonetic units and the ranking of the each of the target language sub-phonetic units, performing a reverse transliteration for each of the target language words to form corresponding words in the source language, identifying candidate target language words based on the reverse transliteration, and displaying the text input in the target language based on the candidate target language words.

In still another embodiment, an electronic device includes a receiver configured to receive text input in a source language, a transliteration engine configured to create source language sub-phonetic units for each word in the text input, convert the source language sub-phonetic units for the each word in the text input to target language sub-phonetic units retrieve ranking of each sub-phonetic unit from a database, retrieve ranking of each of the target language sub-phonetic units from a database, create target language words based on the target language sub-phonetic units and the ranking of the each of the target language sub-phonetic units, and identify candidate target language words based on the reverse transliteration, and a display unit configured to display the candidate transliterated words in a target language.

The features and advantages of the present invention will become more apparent from the ensuing detailed description of the invention taken in conjunction with the accompanying drawings.

According to a method and device for transliteration provided by the present invention, a user is not required to follow rules in order to achieve an efficient transliteration of an input. The inventive method and device do not require fixed rules for transliteration of an input. Moreover, according to the present invention, learning is performed based on sub-phonetic units rather than characters, which enables acquisition of more information by using less memory resources. In addition, with the use of a target language corpus, it is possible to improve the accuracy of a transliteration engine.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
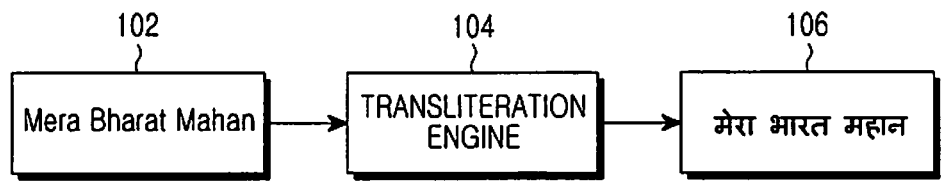
FIG. 1 is an example depicting transliteration.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted for the sake of clarity and conciseness.

FIG. 1 is an example depicting transliteration. In this example, text 102 in a source language needs to be converted into script of a target language. Transliteration engine 104 converts the text 102 from source language (English) to text 106 in target language (Hindi). The transliteration engine 104 enables the user to provide input in the Hindi language by using a keyboard that is configured to provide input in the English language. Though the above example is explained with the source language as English and the target language as Hindi, it will be apparent to a person ordinarily skilled in the art that the transliteration engine 104 can receive input in any source language and can transliterate the input to any desired target language. An electronic device capable of transliterating text from a source language to a target language is described in FIG. 2.

Figure 2:
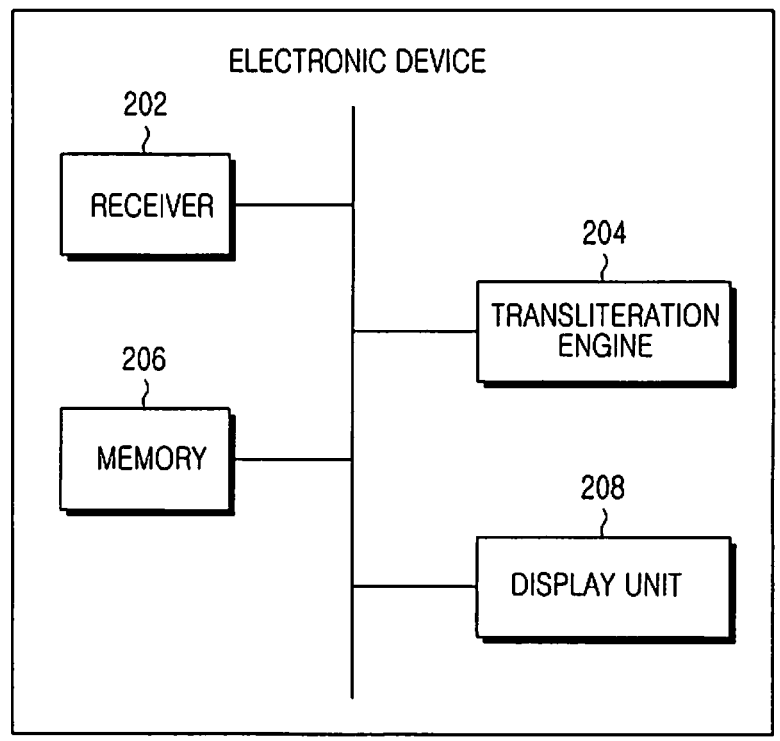
FIG. 2 is block diagram of an electronic device, in accordance with the present invention.

FIG. 2 illustrates an electronic device 200, in accordance with an embodiment of the present invention. The electronic device 200 is capable of transliteration text from a source language to a target language. The electronic device 200 includes a receiver 202 for receiving text input in a source language from its user. The text input can be words, sentences, and/or phrases, for example. The input received by the receiver 202 is provided to the transliteration engine 204, which translates the text input from a source language to a target language, as per convenience of the user. For example, user can provide input text in English language (source language) by using a keyboard/keypad available at the electronic device 200 and select the text input to be transliterated to Hindi language (target language). Similarly, the transliteration engine 204 can transliterate input text provided in a source language to a desired target language. Example of transliteration engine includes a processor configured/programmed to perform transliteration.

The transliteration engine 204 creates source language sub-phonetic units for each word in the text input. Thereafter, the transliteration engine 204 converts the source language sub-phonetic units for each word in the text input to target language sub-phonetic units. The transliteration engine 204 also calculates a preference coefficient for each of the target language sub-phonetic unit and annotates a preference with each of the target language sub-phonetic units, based on the preference coefficient. The preference coefficient indicates strength of relationship of the source language sub-phonetic units with the target language sub-phonetic units. Thereafter, the transliteration engine 204 retrieves ranking of each of the target language sub-phonetic units from a database and creates target language words based on the target language sub-phonetic units and the ranking of the each of the target language sub-phonetic units.

The database can be stored in a memory 206 available at the electronic device 200. Candidate target language words are identified by the transliteration engine, based on predefined criteria. For example, words in target language that are at least 80% close to the source language word are identified as candidate target language words. To determine such closeness of words, the Levensthein distance can be used. In another example, five words in a target language that are closest to the word in a source language can be identified as candidate target language words. The candidate target language words can be displayed on display unit 208.

The transliteration engine 204 is also configured to perform reverse transliteration, which helps filter transliterated words that do not match the input text. The matching of reverse transliterated words can be performed based on a buffer. For example, if the reverse transliterated words match 80% with the word in the source language, corresponding transliterated word can be provided as output or one of the outputs to the user. This technique of reverse transliteration enables in filtering of illegitimate transliterated words.

In an example, the electronic device 200 can also include a disambiguation engine configured to disambiguate the candidate words in the target language.

Figure 3:
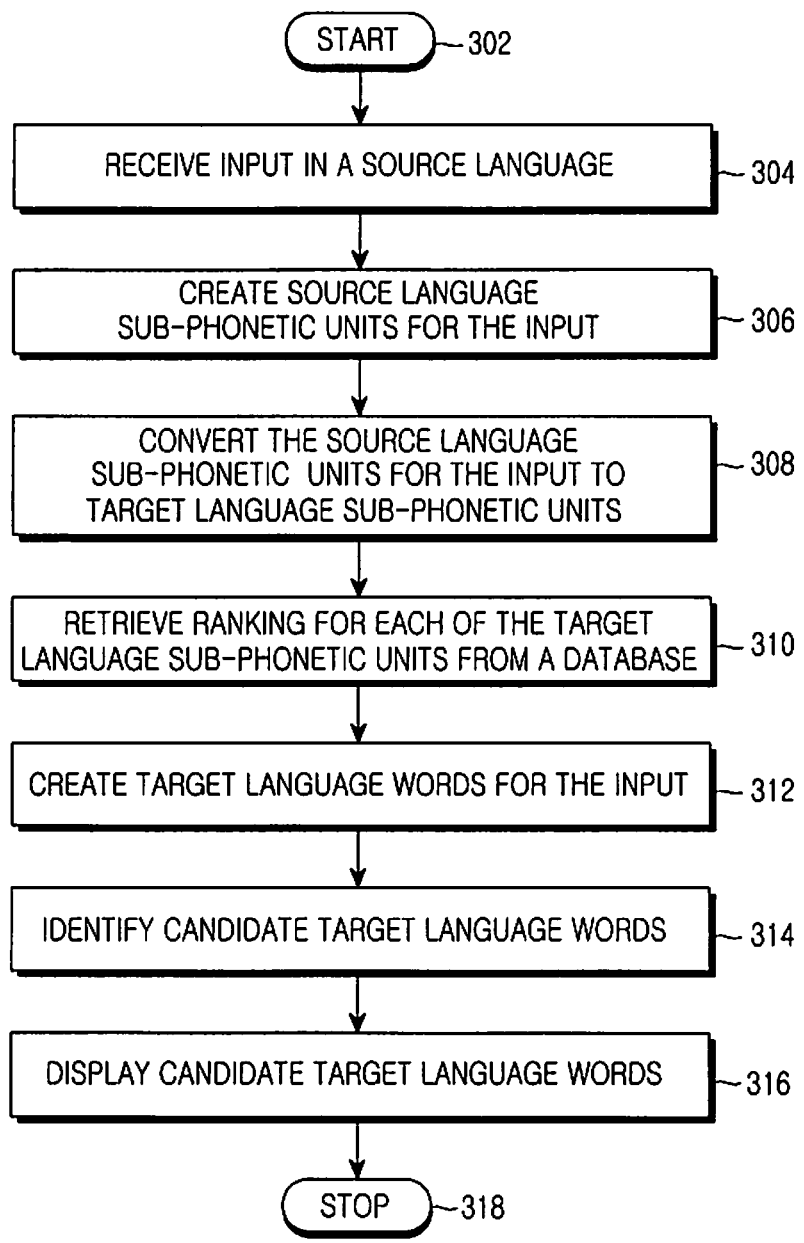
FIG. 3 illustrates a method for transliteration, in accordance with a first embodiment of the present invention.

FIG. 3 illustrates a method for transliteration, in accordance with a first embodiment of the present invention. To explain this embodiment, references will be made to FIG. 2. However, the present invention can be explained with help of any other suitable embodiment. The method for transliteration begins at step 302. At step 304, input in a source language is received by the electronic device 200 from a user. Examples of the input include, but are not limited to, word, words, sentences, phrases, and paragraphs. The input can be received by using the receiver 202 provided at the electronic device 200. The user can type the input by using a keypad, keyboard, virtual keypad, or a software keypad/keyboard available at the electronic device 200.

After the input is received, source language sub-phonetic units for the input are created at step 306. Consider an example, in which a Hindi word 'asmanjas' is received as an input by using source language as English. Once 'asmanjas' is received as input, sub-phonetic units for 'asmanjas' are created in English as 'as', 'smn', 'manj', and 'jas'. Thereafter, the source language sub-phonetic units are converted to target language (Hindi) sub-phonetic units, at step 308. For example, the source language sub-phonetic unit 'as' can be converted to target language sub-phonetic units as 'अस ', 'आस ', and 'अस्'. Similarly, the source language sub-phonetic units, 'smn', 'manj', and 'jas' can be converted to target language sub-phonetics as 'सम्', 'समन', and 'स्म'; 'मंज', 'मंज', 'मॉज', and 'मन्ज'; and 'जस', 'जास', 'जस्', and 'ज्स' respectively. At step 310, ranking for each target language sub phonetic units are retrieved from a database. A ranking for the target language sub-phonetics is provided in Table 1 below:

TABLE 1

| Target language sub-phonetic units | Ranking |
|---|---|
| अस | 1 |
| आस | 3 |
| अस् | 5 |
| सम् | 1 |
| समन | 5 |
| समन | 7 |
| मंज | 2 |
| मंज | 4 |
| मॉज | 8 |
| मन्ज | 10 |
| जस | 5 |
| जास | 7 |
| जस् | 9 |
| ज्स | 11 |

In this example, 1 is the highest ranking (highest priority) for a target language sub-phonetic unit.

At step 312, target language words are created, based on the target language sub-phonetic units and ranking of the target language sub-phonetic units. Multiple target language words can be created for one word in a source language. For example, multiple target language sub-phonetic units can be selected for a source language sub-phonetic unit. The target language sub-phonetic units can be selected based on a threshold ranking. Alternatively, a top two (or more) target sub-phonetic units can be selected for each source language sub-phonetic unit. Accordingly, 'असमंजस', असमंजस, असमनजस, असमनजास, आसमंजस, आसमनजस, आसमनजास, and आसमंजस can be created, if first two target language sub-phonetic units are selected for each source language sub-phonetic unit.

At step 314, candidate target language words can be identified, based on criteria. In an example, the candidate target language words can be reverse transliterated to form corresponding source language words. The reverse transliteration can be performed by first dividing the candidate target language words to form transliterated sub-phonetic units, thereby retrieving ranking for each transliterated sub-phonetic unit from the database. Further, words are formed in a source language for each transliterated sub-phonetic unit. Thereafter, the candidate target language words are selected based on reverse transliteration.

For example, the reverse transliterated words in the source language can be matched with the input word and words matching 80% or more with the input word can be identified as target language words. In another example, one reverse transliterated word (or more words) matching closest to the input words can be identified as target language word. For example, असमंजस, असमंजास, असमनजस, असमनजास, आसमंजस, आसमनजस, आसमनजस, and आसमंजस can be reverse transliterated to asmanjas (100% match with the input word), asmanjaas (75% match with input word), asmanjas (100% match with the input word), asmanjaas (75% match with the input word), aasmanjas (11.11% match with the input word), aasmanjas (11.11% match with the input word), aasmanjaas 10% match with the input word), and aasmanjaas 10% match with the input word). Other known techniques can be used to identify target language words, based on reverse transliteration.

At step 316, असमंजस and असमनजस (target language candidate words) can be displayed (first two reverse transliterated words matching closest to the input word are identified as target language words. In an example, the target language candidate words are provided as an ordered list in order of the percentage match or in order of the frequency of use. The target language words can be validated using target language corpus, prior to displaying the target language candidate words. Thereafter, the user can select a desired candidate word. In an example, a feedback can be provided to the transliteration engine, based on user selection. Also, most frequently used candidate target language word can be displayed (provided as an output to the user), in which example the user can toggle the candidate words in the target language by using a key available in the electronic device 200. Thereafter, the method ends at step 318.

Figure 4A:
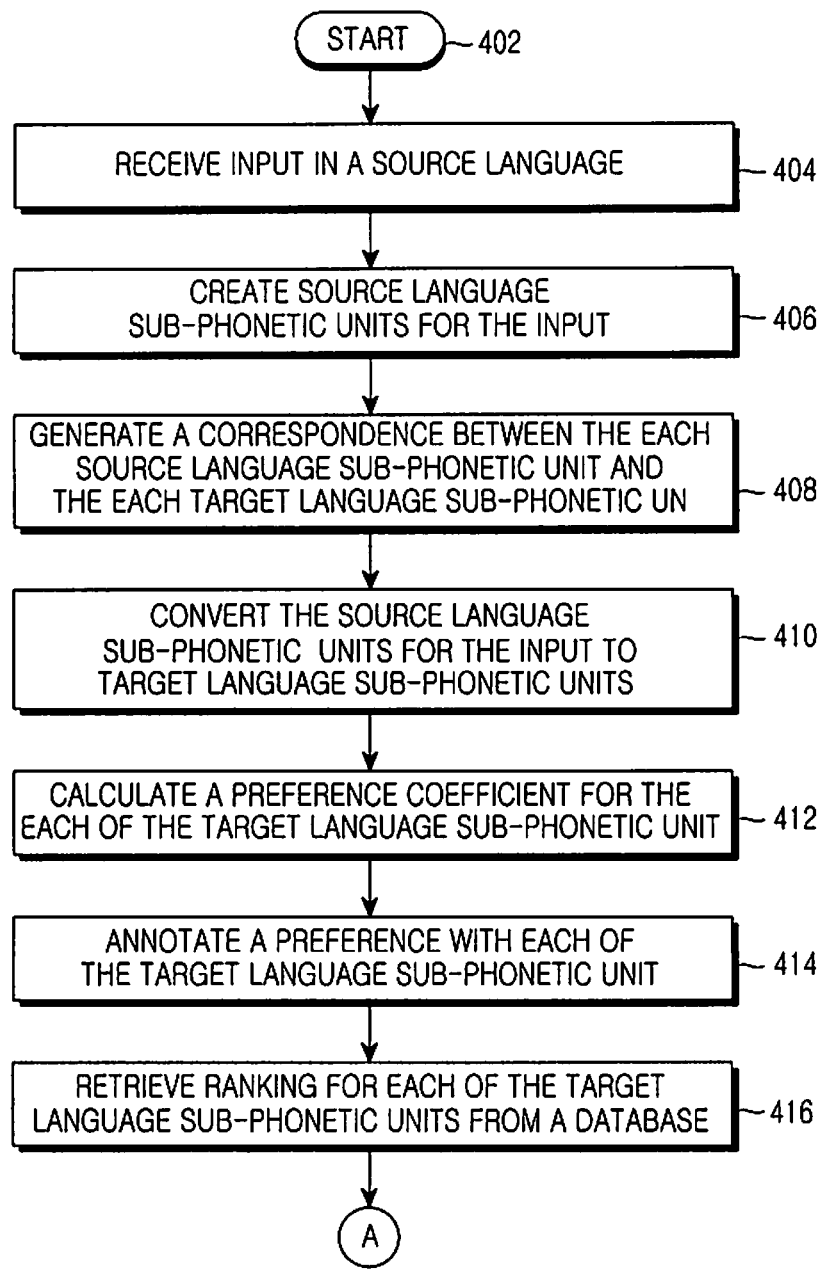
FIGS. 4A and 4B illustrates a method for transliteration, in accordance with a second embodiment of the present invention.
Figure 4B:
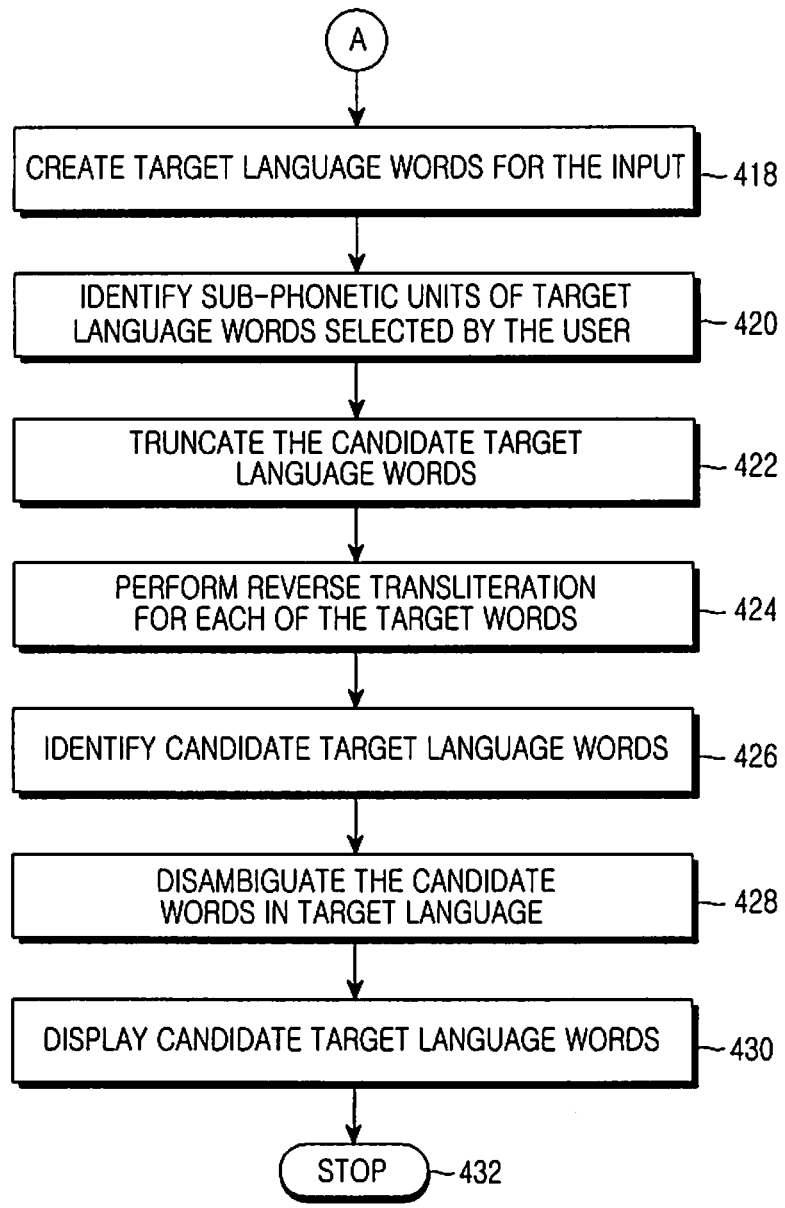

FIGS. 4A and 4B illustrate a flow diagram depicting a method for transliteration, in accordance with a second embodiment of the present invention. To explain this embodiment, reference will be made to FIG. 2 and FIG. 3. However, the present invention can be explained with help of any other suitable embodiment, all in accordance with the present invention. The method can include more or fewer steps than those depicted in FIGS. 4A and 4B. The method is initiated at step 402. At step 404, input is received in source language. Examples of input text include, but are not limited to, a word, sentence, phrases, and paragraphs. At step 406, source language sub-phonetic units are created for the input (as explained in FIG. 3).

At step 408, correspondence is generated between each source language sub-phonetic unit and each target language sub-phonetic unit, by using mapping of the source language sub-phonetic unit with the target language sub-phonetic unit. In an example, the correspondence between the source language sub-phonetic unit and target language sub-phonetic unit can be generated by using reflective coefficients providing probabilities of bindings of source language sub-phonetic units with the target language sub-phonetic units. The reflective coefficients can be calculated by using a Bayesian factor.

At step 410, the source language sub-phonetic units for the input are converted to target language sub-phonetic units (as explained in FIG. 3). Thereafter, the preference coefficient indicating strength of relationship of the source language sub-phonetic units with the target language sub-phonetic units is calculated at step 412. Preference coefficient can be calculated by using a Bayesian estimation. Thereafter, the preference coefficients are annotated with each of the target language sub-phonetic at step 414.

At step 416, ranking for each of the target language sub-phonetic units are retrieved from a database. The ranking for a target language sub-phonetic can be calculated based on a preference coefficient of the target language sub-phonetic and/or correspondence between the target language sub-phonetic unit and the source language sub-phonetic units. For example, ranking of a target language sub-phonetic unit can be calculated by using a normalization function between preference coefficients, and correspondence between the target language sub-phonetic unit and the source language sub-phonetic units.

At step 418, the target language word(s) for the input are created (as explained in FIG. 3). At step 420, the target language words selected by the user are identified based on sub-phonetic units. At step 422, the candidate target language words are truncated based on preference of the sub-phonetic units in the candidate target language words. At step 424, the truncated candidate target language words are reverse transliterated by using correspondence between a source language sub-phonetic and target language sub-phonetic units and the reflective coefficient. The between a source language sub-phonetic and target language sub-phonetic units is based on mapping of each source language sub-phonetic unit with each target language sub-phonetic unit.

At step 426, the candidate target language words are identified based on reverse transliteration of the truncated candidate target language words. At step 428, the candidate target language words are disambiguated. Thereafter, the candidate target language words are displayed to the user at step 430. The target language candidate words may be provided as an ordered list in order of the percentage match or of the frequency of use. The target language words may also be validated using target language corpus, prior to displaying the target language candidate words. Thereafter, the user can select a desired candidate word. A feedback can be provided to the transliteration engine, based on user selection. For example, most frequently used candidate target language word can be displayed (provided as an output to the user). In this example, the user can toggle the candidate words in target language by using a key available in the electronic device 200. Thereafter, the method ends at step 432.

Figure 5:
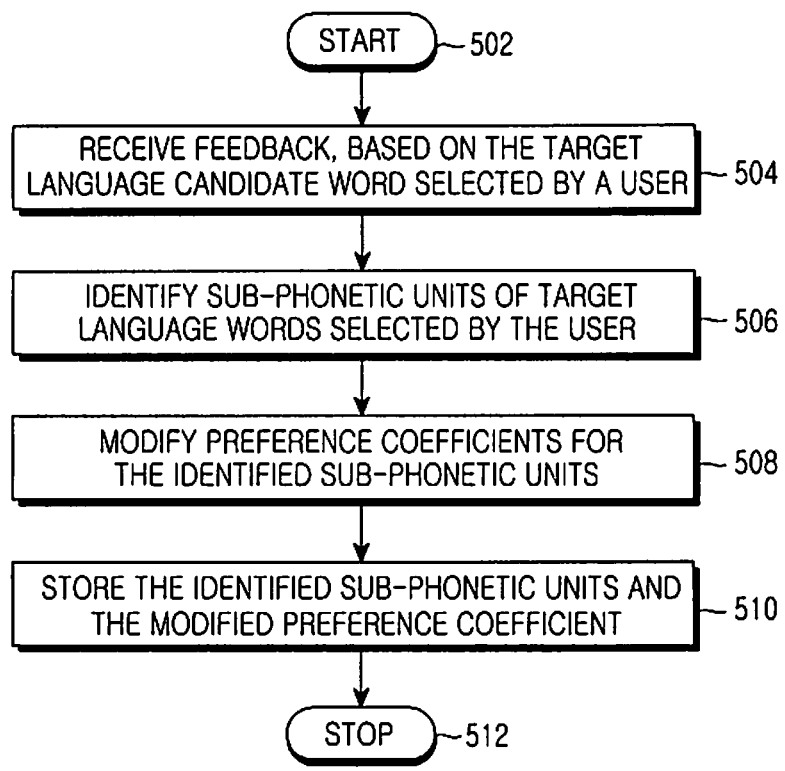
FIG. 5 illustrates a method for training instances, in accordance with a first embodiment of the present invention.

FIG. 5 illustrates a method for training instances, in accordance with a first embodiment of the present invention. To explain this embodiment, reference will be made to FIG. 2 and FIG. 3. However, the present invention can be explained with help of any other suitable embodiment, all in accordance with the present invention. In addition, the method can include more steps than those depicted in FIG. 5.

At step 502, the method begins. At step 504, a feedback is received by the transliteration engine, based on the candidate target language word selected by the user. For example, the user can select a desired candidate target language words from a list of candidate target language words displayed at the electronic device 200.

At step 506, sub-phonetic units of target language word selected by the user are identified. Suppose in the above example, user selects असमनजस from असमंजस and असमनजस, the sub-phonetic units of असमनजस are identified as अस , समन , मन , and जस .. Thereafter, the preferences/ranking of the sub-phonetics अस , समन , मन , and जस are modified at step 508. For example, the ranking of समन can be increased to 3 from 5 and the ranking of जस can be increased to 4 from 5. In addition, मन can be added to Table 1, if it does not exist or ranking of मन can be increased. Since अस has the highest ranking, its ranking can remain unaltered.

The modified rankings/preferences corresponding to the identified sub-phonetic units are stored/updated in the database at step 510. Additional identified sub-phonetic units and corresponding rankings/preferences can also be stored in the database. Thereafter, the method ends at step 512.

Figure 6:
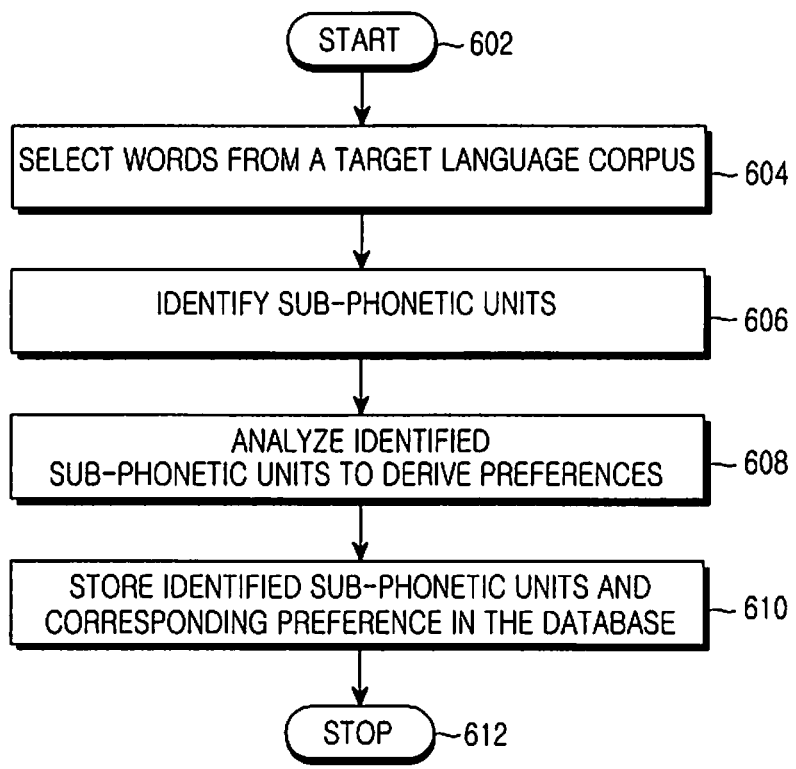
FIG. 6 illustrates a method for training instances, in accordance with a second embodiment of the present invention.

FIG. 6 illustrates a method for training instances, in accordance with a second embodiment of the present invention. At step 602, the method begins. At step 604, words are selected by probing a target language corpus. The corpus contains list of words of target language maintained in the order of frequency of usage of the words, which helps to achieve higher accuracy for most commonly used words.

Sources of corpus can be web pages, documents, letters, story books and the like containing words in the target language. Deriving sub-phonetic units of the target language is independent of source language specifications and does not require any knowledge of the source language. In general, for a particular target language, identification of sub-phonetic units and thereby annotating the sub-phonetic units with required information requires a single training execution irrespective of the source language.

As a result, once the transliteration engine 204 is trained for sub-phonetic unit and reflective coefficients, the transliteration engine 204 can be used as a target language for multiple source languages. Accordingly, the time required for training the transliteration engine 204 and memory required for storing the identified sub-phonetic units are reduced.

The sub-phonetic units for the words are identified based on frequently used phoneme sequence from the words in the corpus of target language at step 606. The phoneme sequence can vary depending upon the frequency of their usage. The identification of sub-phonetic unit can be used to generate the source-target language correspondence. Alternatively, a correspondence can be generated using seed inputs, or by using predefined maps. The correspondence between the source and target language phonetics is based on the reflective coefficients. In an example, a Bayes factor can be used to measure the correspondence between source and target language based on reflective coefficients.

At step 608, the identified sub-phonetic units are analyzed to derive preferences. At step 610, the identified sub-phonetic units and corresponding preferences are stored in the database. The identified sub-phonetic units and the corresponding preferences can be used for transliterating an input in any language to the language in which corpus is written. Thereafter, the method ends at step 612.

Various embodiments of the present invention provide the following advantages. Techniques described in present invention do not require a user to follow rules to efficiently transliterate an input. For example, 'D' is mapped to 'ड ' and 'd' is mapped to 'द '. The transliteration process provides flexibility to a user to input words in the user's conventional manner. For example, to receive output as "आइये" (in Hindi) user can input the text as 'aaie', 'aaiye' or 'aie'. Transliteration works on sub-phonetic preference model and reverse transliteration using reflective coefficients, and thus does not require static rules for transliterating an input. Also, the learning is performed on sub-phonetic units rather than on a per character basis, thereby capturing more information using less memory resources.

Training model of transliteration engine does not require any knowledge of the source language and target language word mapping, which makes transliteration independent of the source language. Thus, a memory-bogging multilingual dictionary is not required (memory is saved). Thus, the transliteration engines of the present invention can also be used effectively with electronic devices having less processing power and limited memory (for example, embedded systems).

Learning of the transliteration is an ongoing process. This learning process provides functionalities to adapt to the user behavior based on selections of transliterated words from a list of words presented to the user. Further, use of target language corpus improves the accuracy of the transliteration engine.

While certain embodiments of the present invention have been illustrated and described herein, it will be clear that the present invention and its advantages are not limited to these embodiments only. Accordingly, numerous modifications, changes, variations, substitutions and equivalents will be apparent to those skilled in the art without departing from the spirit and scope of the present invention as described in the claims. Accordingly, the specification and figures are to be regarded as illustrative examples of the invention, rather than in a restrictive sense.

What is claimed is:

1. A method for transliteration by a transliteration device including a receiver, a processor, and a display, the method comprising:
   receiving, by the receiver, a text input in a source language from a user;
   creating, by the processor, source language sub-phonetic units for each word in the text input;
   converting, by the processor, the source language sub-phonetic units for the each word in the text input to target language sub-phonetic units;
   retrieving, by the processor, ranking of each of the target language sub-phonetic units from a database;
   creating, by the processor, target language words based on the target language sub-phonetic units and the ranking of each of the target language sub-phonetic units;
   identifying, by the processor, candidate target language words by performing a reverse transliteration for the created target language words; and
   displaying, by the display, the candidate target language words to the user.

2. The method of claim 1, further comprising:
   calculating a preference coefficient for each of the target language sub-phonetic units; and
   annotating a preference with each of the target language sub-phonetic units, based on the preference coefficient, wherein the preference coefficient indicates strength of relationship of the source language sub-phonetic units with the target language sub-phonetic units.

3. The method of claim 2, wherein the preference coefficient is calculated by using Bayes estimation.

4. The method of claim 1 further comprising generating a correspondence between the each source language sub-phonetic unit and the each target language sub-phonetic unit.

5. The method of claim 4, wherein the correspondence between the each source language sub-phonetic unit and the corresponding target language sub-phonetic unit is generated based on mapping of the each source language sub-phonetic unit with the each target language sub-phonetic unit.

6. The method of claim 4, wherein the correspondence between the each source language sub-phonetic unit and the each target language sub-phonetic unit is formed by using reflective coefficients, wherein the reflective coefficients provide probabilities of bindings of source language sub-phonetic units with the target language sub-phonetic units.

7. The method of claim 6, wherein the reflective coefficients are measured by using Bayesian factor.

8. The method of claim 1, further comprising performing training instances of the sub-phonetic units.

9. The method of claim 8, wherein the training instances comprises:
   receiving feedback, based on the target language words selected by the user;
   identifying sub-phonetic units of target language words selected by the user;
   modifying preference coefficients for the identified sub-phonetic units; and
   storing the identified sub-phonetic units and the modified preference coefficient.

10. The method of claim 8, wherein the performing training instances comprises:
    selecting learned words from a target language corpus;
    forming learned sub-phonetic units based on frequently used phoneme sequences in the target language corpus;
    analyzing learned sub-phonetic units to derive preferences; and
    storing learned sub-phonetic units and corresponding preferences in the database.

11. The method of claim 1, wherein the displayed candidate target language words are selected by the user.

12. The method of claim 1 further comprising truncating the candidate target language words based on preferences of the sub-phonetic units identified in candidate words, wherein the preferences of the sub-phonetic units are identified based on preference coefficients and a threshold.

13. The method of claim 12, wherein target language words are generated according to a reverse transliteration of truncated candidate words into the source language.

14. The method of claim 13, wherein the truncated candidate words are reverse transliterated by using a correspondence between a source language sub-phonetic and a target language sub-phonetic units based on mapping of the each source language sub-phonetic unit with the each target language sub-phonetic unit, and reflective coefficients.

15. The method of claim 1, further comprising disambiguating the candidate target language words.

16. The method of claim 1, wherein identifying candidate target language words by performing the reverse transliteration comprises:
    dividing the target language words to form transliterated sub-phonetic units;
    retrieving ranking for each transliterated sub-phonetic unit from the database;

forming words in the source language from the each translated sub-phonetic units; and identifying the candidate target language words according to a degree of matching between the formed source language words and the target language words.

17. The method of claim 1 further comprising validating the candidate target language words based on a target language corpus.

18. The method of claim 1, wherein the text input in the target language is displayed as an ordered list.

19. An electronic device comprising:
a receiver configured to receive text input in a source language from a user;
a processor configured to create source language sub-phonetic units for each word in the text input, convert the source language sub-phonetic units for the each word in the text input to target language sub-phonetic units, retrieve ranking of each of the target language sub-phonetic units from a database, create target language words based on the target language sub-phonetic units and the ranking of the each of the target language sub-phonetic units, and identify candidate target language words performing a reverse transliteration for the created target language words; and
a display configured to display the candidate target language words to the user.

20. The electronic device of claim 19, further comprising a disambiguation module configured to disambiguate the candidate words in the target language.

21. The electronic device of claim 19, wherein the processor is further configured to calculate a preference coefficient for the each of the target language sub-phonetic units, and annotate a preference with each of the target language sub-phonetic units, based on the preference coefficient,
wherein the preference coefficient indicates strength of relationship of the source language sub-phonetic units with the target language sub-phonetic units.

22. The electronic device of claim 19, wherein the processor generates a correspondence between the each source language sub-phonetic unit and the each target language sub-phonetic unit,
wherein the correspondence is generated based on mapping of the each source language sub-phonetic unit with the each target language sub-phonetic unit or by using reflective coefficients, and
the reflective coefficients provide probabilities of bindings of source language sub-phonetic units with the target language sub-phonetic units.

23. The electronic device of claim 19, wherein, in order to train instances of the sub-phonetic units, the processor receives feedback based on the target language words selected by the user, identifies sub-phonetic units of target language words selected by the user, modifies preference coefficients for the identified sub-phonetic units, and stores the identified sub-phonetic units and the modified preference coefficient.

24. The electronic device of claim 19, wherein, in order to train instances of the sub-phonetic units, the processor selects learned words from a target language corpus, forms learned sub-phonetic units based on frequently used phoneme sequences in the target language corpus, analyzes learned sub-phonetic units to derive preferences, and stores learned sub-phonetic units and corresponding preference in the database.

25. The electronic device of claim 19, wherein the processor truncates the candidate target language words based on preferences of the sub-phonetic units identified in candidate words,
wherein the preferences of the sub-phonetic units are identified based on preference coefficient and a threshold.

26. The electronic device of claim 19, wherein the processor generates target language words according to a reverse transliteration of truncated candidate words into the source language,
wherein the truncated candidate words are reverse transliterated by using a correspondence between a source language sub-phonetic and a target language sub-phonetic units based on mapping of the each source language sub-phonetic unit with the each target language sub-phonetic unit, and reflective coefficients.

27. The electronic device of claim 19, wherein, in order to identify candidate target language words by performing the reverse transliteration, the processor divides the target language words to form transliterated sub-phonetic units, retrieves ranking for each transliterated sub-phonetic unit from the database, forms words in the source language from the each translated sub-phonetic units, and identifies the candidate target language words according to a degree of matching between the formed source language words and the target language words.

28. The electronic device of claim 19, wherein the processor validates the candidate target language words based on a target language corpus.

* * * * *